(12) United States Patent
Yasui et al.

(10) Patent No.: US 12,030,112 B2
(45) Date of Patent: Jul. 9, 2024

(54) CASTING CORE CONTAINING CERAMIC AND METHOD FOR MANUFACTURING CAST ARTICLE USING THE SAME

(71) Applicant: CANON KABUSHIKI KAISHA, Tokyo (JP)

(72) Inventors: Nobuhiro Yasui, Kanagawa (JP); Yasushi Shimizu, Kanagawa (JP); Shunsuke Murakami, Tokyo (JP); Kanako Oshima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 17/714,906

(22) Filed: Apr. 6, 2022

(65) Prior Publication Data

US 2022/0379369 A1 Dec. 1, 2022

(30) Foreign Application Priority Data

Apr. 12, 2021 (JP) ................. 2021-067068

(51) Int. Cl.
*B22C 9/10* (2006.01)
*B22C 7/02* (2006.01)
*B28B 1/00* (2006.01)
*B28B 11/04* (2006.01)
*B28B 11/08* (2006.01)
*B33Y 10/00* (2015.01)
*B33Y 40/20* (2020.01)
*B33Y 80/00* (2015.01)

(52) U.S. Cl.
CPC ................. *B22C 9/103* (2013.01); *B22C 7/02* (2013.01); *B22C 9/10* (2013.01); *B28B 1/001* (2013.01); *B28B 11/04* (2013.01); *B28B 11/0845* (2013.01); *B33Y 10/00* (2014.12); *B33Y 40/20* (2020.01); *B33Y 80/00* (2014.12)

(58) Field of Classification Search
CPC .................................. B22C 9/10; B22C 9/103
USPC .......................................................... 164/369
See application file for complete search history.

(56) References Cited

FOREIGN PATENT DOCUMENTS

JP 2013071169 A 4/2013

*Primary Examiner* — Kevin P Kerns
(74) *Attorney, Agent, or Firm* — CANON U.S.A., INC. IP Division

(57) ABSTRACT

A casting core containing a ceramic and having sufficient mechanical strength to withstand a casting process over a long period of time and good solubility in alkaline solutions. The casting core includes a core, a surface layer, and an intermediate layer between the core and the surface layer. The intermediate layer has a lower relative density than the surface layer and the core.

13 Claims, 3 Drawing Sheets

US 12,030,112 B2

CASTING CORE CONTAINING CERAMIC AND METHOD FOR MANUFACTURING CAST ARTICLE USING THE SAME

BACKGROUND OF THE INVENTION

Field of the Invention

The present disclosure relates to casting cores containing ceramics as major components for use in precision metal casting.

Description of the Related Art

Casting cores formed of ceramics (ceramic cores) that are used to form channels inside turbine blades for use in engines such as aircraft engines require sufficient form stability to withstand a stress induced during a casting process over a long period of time. In addition, after completion of the casting process, the casting core inside the cast article needs to be dissolved in, for example, a strong alkaline solution. Thus, casting cores require not only high-temperature stability, but also solubility in strong alkaline solutions.

To meet such requirements, casting cores in the related art are formed of a silica-based porous body with a relative density of about 70% so that a strong alkaline solution can easily permeate therethrough in order to increase the solubility in strong alkaline solutions. To achieve a higher strength and solubility, Japanese Patent Laid-Open No. 2013-71169 proposes a casting core formed of a porous material having a three-layer structure with different relative densities in which the relative density decreases from the surface layer toward the core.

However, precision casting cores in the related art are formed of a porous material and have a three-point flexural strength of about 10 to about 34 MPa. These precision casting cores have insufficient strength because casting cores for use in casting processes over a long period of time, such as those for casting of aircraft engine parts, require a three-point flexural strength of 40 MPa or more.

SUMMARY OF THE INVENTION

According to the present disclosure, there is provided a casting core containing a ceramic. The casting core includes a core, a surface layer, and an intermediate layer between the core and the surface layer. The intermediate layer has a lower relative density than the surface layer and the core.

Further features of the present disclosure will become apparent from the following description of exemplary embodiments with reference to the attached drawings.

DESCRIPTION OF THE EMBODIMENTS

Embodiments of the present disclosure will now be described with reference to the drawings. The present disclosure is not limited to the following specific examples, and modifications can be made within the technical concept of the present disclosure.

Figure 1A:
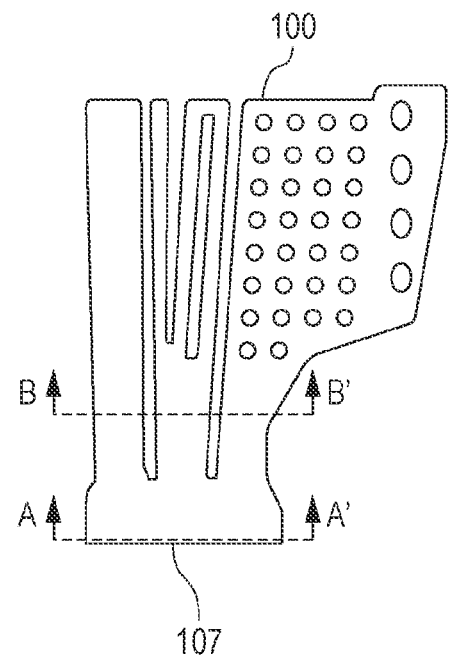
FIGS. 1A and 1B are an overall view and partial sectional views schematically illustrating a casting core according to one embodiment of the present disclosure.
Figure 1B:
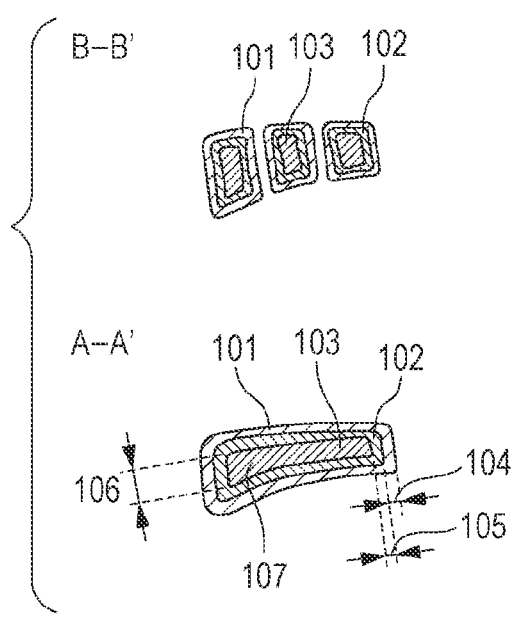

FIGS. 1A and 1B illustrate a casting core (hereinafter also simply referred to as "core") according to one embodiment of the present disclosure and its cross sections. As illustrated in cross sections taken along lines A-A' and B-B', a casting core 100 has a structure including a surface layer 101, an intermediate layer 102, and a core 103. The intermediate layer 102 has a lower relative density than the surface layer 101 and the core 103.

The density of a casting core is calculated by dividing the mass of the casting core by its volume. The relative density of a casting core is calculated as the proportion of its density to a theoretical density determined by taking into account the phases of the compounds contained in the casting core. The average relative density of a casting core is calculated as the proportion, to the theoretical density, of a value obtained by dividing the mass of the casting core by a volume enclosed by the surface of the casting core.

To ensure sufficient mechanical strength to resist deformation, the core 103 of the casting core 100 may be formed of a dense ceramic, and the surface layer 101 may also be formed of a relatively dense porous material or a dense ceramic. To improve the solubility in alkaline solutions, on the other hand, the individual portions forming the casting core 100 may have a smaller wall thickness or a lower density (more porous).

The intermediate layer 102 of the casting core 100 according to the present disclosure has a structure with a lower density than other portions so that an alkaline solution can sufficiently permeate through the intermediate layer 102. Therefore, the surface layer 101 that is in contact with the cast article can be efficiently dissolved from inside. The core 103 that is not in contact with the cast article can be discharged outside the cast article together with the dissolved surface layer 101 and intermediate layer 102.

A casting core that requires partial adjustments in wall thickness or density can be manufactured by additive manufacturing technology. In particular, an infrared laser melting process (or a selective laser melting process) in which an object is built layer by layer by sintering or melting and solidifying a raw material powder may be used. The density of each portion can be controlled by changing the amount of heat supplied to the raw material powder by the laser beam to adjust the degree of sintering or melting, or by adjusting, for example, the pitch of irradiation with the laser beam to sinter or melt and solidify the raw material powder in a lattice pattern. "Sinter or melt and solidify the powder" may hereinafter be expressed as "solidify the powder".

To ensure sufficient mechanical strength as a casting core while facilitating dissolution later, the surface layer 101 preferably has a thickness 104 of from 0.2 mm to 5 mm, more preferably from 0.3 mm to 3 mm. To allow a sufficient amount of alkaline solution to permeate through the intermediate layer 102, the intermediate layer 102 may have a thickness 105 of 0.2 mm or more. The intermediate layer 102 preferably has a thickness 105 of from 0.5 mm to 5 mm, more preferably from 0.5 mm to 3 mm. For casting cores having complicated shapes, the core 103 may constitute the remaining portion excluding the thickness 104 of the surface layer 101 and the thickness 105 of the intermediate layer 102. The core 103 need only be formed in at least a portion of the casting core 100. For example, if the casting core 100 has a shape including a tapered end portion or a portion with a reduced wall thickness, the core 103 need not be provided in such portions. The core 103 may be provided inside the surface layer 101 with the intermediate layer 102 therebetween when the surface layer 101 alone cannot ensure sufficient strength. By providing the core 103, sufficient strength can be achieved to withstand a casting process even if the surface layer 101 alone cannot ensure sufficient strength. When the casting core 100 includes the core 103, the core 103 is effective in enhancing the strength of the casting core 100 if the core 103 has a thickness 106 of 0.2 mm or more. To enhance the strength of the casting core 100, the core 103 preferably has a thickness 106 of 0.3 mm or more, more preferably 1 mm or more.

The surface layer 101 may be a dense portion or a relatively dense porous portion and may have a relative density of 82% or more. If the surface layer 101 is a porous body, the surface layer 101 may have a sufficiently higher relative density than at least the intermediate layer 102.

The intermediate layer 102 preferably has a relative density of from 20% to 67%, more preferably from 50% to 67%, which ensures sufficient solution permeability and solution flowability when the core 100 is dissolved in, for example, an alkaline solution after a casting process. Solution flowability is important in allowing fresh aqueous alkaline solution to reflux as appropriate without saturation of the core component dissolved in the alkaline solution. As a technique for maintaining the intermediate layer 102 at a relative density of 67% or less, the intermediate layer 102 may have a lattice structure. The beams forming the lattice structure preferably have a thickness of 0.2 mm or more, more preferably 0.3 mm or more. Although the maximum thickness of the beams is not particularly specified, the beams may have a thickness of 1 mm or less at least at positions where the beams are in contact with the surface layer 101.

If the intermediate layer 102 has a lattice structure, the thickness 106 of the core 103 may be larger than the thickness of the beams forming the lattice of the intermediate layer 102. There is no particular restraint on the design of the contact portions between the lattice structure of the intermediate layer 102 and the core 103.

An exposed portion 107 in which the intermediate layer 102 and the core 103 are exposed is provided in the casting core 100 to supply an alkaline solution from the exposed portion 107 after a casting process. This allows an alkaline solution to reflux quickly throughout the core 100 inside the cast article via the intermediate layer 102.

In view of the reflux of an alkaline solution, a plurality of exposed portions 107 may be provided as an inlet and an outlet for an alkaline solution. In addition, if the intermediate layer 102 and/or the core 103 includes a portion with a thickness of 1 mm or more, it may have a pattern or shape that allows it to be dissolved and broken in an alkaline solution so that it can be withdrawn from the exposed portion 107. For example, a partially discontinuous portion or an easily soluble portion with reduced thickness may be provided in the intermediate layer 102 and/or the core 103 so that a portion with a wall thickness of 1 mm or more dissolves and splits to a size that allows it to be discharged from the exposed portion 107.

The alkaline solution used for dissolution of the casting core 100 may be an aqueous solution containing sodium hydroxide, potassium hydroxide, or the like as a major component. Although there is no particular limitation on the concentration of the aqueous solution, it is preferably about 10 to about 35 wt %, more preferably 20 to 30 wt %, particularly preferably 23 to 27 wt %. The amounts of carbonate, chloride, impurity iron, and the like present in the aqueous solution may be less than 0.1 wt %.

During dissolution, the casting core 100 may be heated at a temperature in the range from room temperature to 300° C. as long as the metal cast article is not affected. For heating to 100° C. or higher, pressurization is important to inhibit volatilization of the solution. Furthermore, pressurization and depressurization may be repeated during the core dissolution step to remove, for example, bubbles formed during dissolution.

If the intermediate layer 102 has a lattice structure, the intermediate layer 102 may take various forms of lattice. The intermediate layer 102 may have an asymmetric lattice structure, a repeating-unit structure, or a combination of a plurality of structures. Specifically, lattices such as diamond structures and gyroid structures, which are widely used in additive manufacturing, may be used. The relative density of the intermediate layer 102 can be adjusted to the desired value by changing the thickness of the beams forming the lattice structure and the beam-to-beam distance.

Instead of forming the intermediate layer 102 as a lattice structure, a configuration in which a channel for an alkaline solution is provided in a porous body may be formed. In this case, the relative density of the entire intermediate layer 102 may be 67% or less. A lattice structure and a porous body are distinguished by void size. "Lattice structure" refers to a structure in which spaces formed between beams have a minor axis of 0.2 mm or more, whereas "porous" refers to a structure having an average pore size of less than 0.2 mm.

A coat layer may be provided on the outermost surface of the surface layer 101. Since the coat layer on the core 100 is to be in contact with a cast article, the coat layer can impart various functions. For example, the coat layer can be provided to smoothen the surface layer 101, to alleviate the difference in thermal expansion between the surface layer 101 and the cast article, or to block the elements present in the surface layer 101 from diffusing into the cast article. The material for the coat layer 101 may be selected as appropriate depending on the intended function. The material for the coat layer 101 may be the same as or different from the material for the core 100 and may be a material that does not react with the cast article and that dissolves in an alkaline solution together with the core 100. The coat layer need not be provided over the entire surface layer 101, but may be provided in the desired region. The coat layer may have a relative density of 82% or more. The coat layer may be formed by a coating process in which, after completion of building by additive manufacturing, a glaze-like material is applied or sprayed onto the surface and is baked. Alternatively, the coat layer may be formed by a thermal spraying process, a vacuum deposition process, a sputtering process, a chemical vapor deposition (CVD) process, or another similar process. Although there is no particular restraint on the thickness of the coat layer, the coat layer preferably has a thickness of 20 nm or more and preferably has a thickness of 1 mm or less to impart functionality.

Next, a process of manufacturing the casting core according to the present disclosure and a process of fabricating a cast part using the casting core according to the present disclosure will be described.

Process of Manufacturing Casting Core

Although the method of manufacture is not limited as long as the method can be used to achieve a structure including three portions according to the present disclosure, a casting core may be manufactured using a powder bed fusion process. In a powder bed fusion process, a powder is uniformly laid down on a substrate at a predetermined thickness and is sintered or melted and solidified by irradiation with a laser beam, and this procedure is performed multiple times to build an object.

Figure 2:
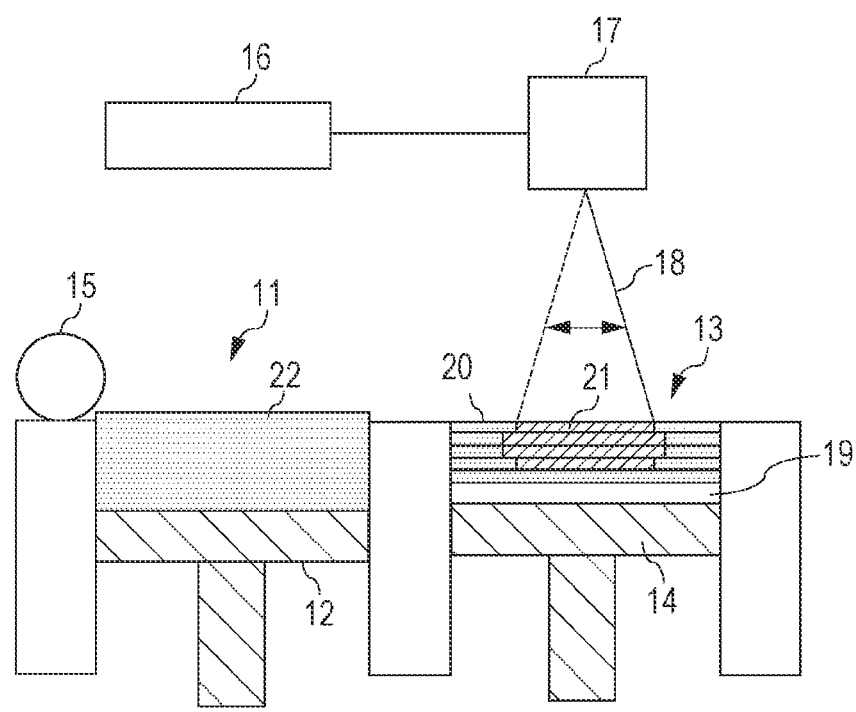
FIG. 2 is a conceptual diagram of a building apparatus for building an object using a powder bed fusion process.

FIG. 2 is a conceptual diagram of a building apparatus for building an object using a powder bed fusion process. The building apparatus includes a powder box 11, a container 13 in which building is performed, a recoater unit 15, a laser light source 16, and a scanner unit 17 that scans a laser beam 18 emitted from the laser light source 16. The laser beam 18 emitted from the laser light source 16 is scanned by the scanner unit 17 depending on slice data generated from three-dimensional data for a ceramic article to perform direct drawing on a powder 20 uniformly laid down on the substrate 19. The drawn region is sintered or melted and solidified, and this procedure is repeated to obtain a built object 21 composed of a stack of solidified portions.

The individual steps of the process using the apparatus in FIG. 2 will be described below.

Step 1: Step of Uniformly Laying Down Powder at Predetermined Thickness

In step 1, the bottom 12 of the powder box 11 is lifted to raise a material powder 22, and a stage 14 of the container 13 on which the substrate 19 is set is lowered by a predetermined distance. The material powder 22 is then supplied to the container 13 by the recoater unit 15, and the powder 20 is uniformly laid down at a predetermined thickness in a region wider than the intended ceramic article.

Although a wide variety of compositions can be used as a core building powder for ceramic casting cores depending on use, a core building powder containing a metal oxide as a major component may be used. A core building powder containing a metal oxide as a major component does not cause building defects due to decomposition or gasification upon irradiation with an energy beam. A powder containing a high proportion of a resin component or a carbon-containing material would, for example, burn, decompose, or gasify upon rapid heating and would therefore cause defects such as many vacancies in solidified portions and bonding defects between solidified portions.

The main component of the metal forming the metal oxide may be at least one element selected from the group consisting of silicon, aluminum, and zirconium. In particular, aluminum oxide, silicon oxide, and zirconium oxide (including stabilized zirconia) may be present in a total amount of 50 mol % or more. The total amount may include the amount of a complex oxide thereof.

The amounts of alkali and alkaline earth metals in the core building powder may be as low as impurity levels, and the core building powder may be free of the major component forming the metal to be cast. Specifically, the total content of alkali and alkaline earth metals is preferably 0.1% by weight or less, more preferably 0.01% by weight or less.

The core building powder can be composed of a desired combination of major and minor components. As the minor components, the core building powder may contain, for example, rare earth oxides and materials that serve as absorbers that absorb and convert infrared laser light into heat. An example of a rare earth oxide is an oxide of a metal selected from the group consisting of Sc, Y, La, Ce, Nd, Sm, Eu, Gd, Dy, Ho, Er, Tm, Yb, and Lu. Rare earth oxides may be present in the form of a complex oxide composed of major and minor components. Examples of absorbers include $Tb_4O_7$, $Pr_6O_{11}$, $Ti_2O_3$, TiO, SiO, ZnO, antimony-doped tin oxide (ATO), indium-doped tin oxide (ITO), TiC, ZrC, NbC, VC, HfC, WC, $Mo_2C$, TaC, WC—TiC, WC—TaC, WC—TiC—TaC, TiN, ZrN, VN, NbN, TaN, $Cr_2N$, HfN, $Si_3N_4$, AlN, $TiB_2$, $ZrB_2$, $VB_2$, $NbB_2$, $TaB_2$, CrB, MoB, WB, $LaB_6$, $HfB_2$, $TiSi_2$, $ZrSi_2$, $NbSi_2$, $TaSi_2$, $CrSi_2$, $MoSi_2$, $WSi_2$, $FeSi_2$, and $HfSi_2$.

One example is a core building powder containing aluminum oxide as a major component and also containing at least one of gadolinium oxide, terbium oxide, and praseodymium oxide.

If the powder contains gadolinium oxide, the powder has a lower melting point near the $Al_2O_3$—$Gd_2O_3$ eutectic composition than aluminum oxide alone. The powder can therefore be melted with a smaller amount of heat, which inhibits diffusion of a laser beam within the powder and thus improves the building accuracy. In addition, if the powder contains gadolinium oxide, the built object has a phase-separated structure including a plurality of phases.

This inhibits crack propagation and thus improves the mechanical strength of the built object. Oxides of other rare earth elements (excluding terbium and praseodymium) also have similar effects to gadolinium oxide when contained instead of gadolinium oxide. Terbium oxide ($Tb_4O_7$) and praseodymium oxide ($Pr_6O_{11}$) function as absorbers that absorb and convert near-infrared laser light emitted from lasers such as Nd:YAG lasers and Yb fiber lasers into heat. The addition of these materials as minor components to the core building powder inhibits spread of heat within the powder and allows the powder to melt and solidify locally. This reduces the effect of heat on the non-building portion and thus improves the building accuracy.

Another example of a core building powder is a powder containing silicon oxide as a major component. A powder containing silicon oxide as a major component may further contain, for example, aluminum oxide or zirconium oxide, and may also contain at least one selected from materials that function as absorbers. In particular, the powder may contain silicon monoxide as an absorber. A powder containing silicon oxide and aluminum oxide forms a compound of $Si_2O_2$—$Al_2O_3$ within the built object, thus contributing to improved strength due to the formation of a complex oxide.

Although the core building powder is not limited to these examples, a mixed powder of $Al_2O_3$, $Gd_2O_3$, and $Tb_4O_7$ or a mixed powder of $SiO_2$, $Al_2O_3$, and SiO may be used as a material system. To achieve the composition or structure required of the core after manufacture, various approaches can be employed as appropriate, including the use of a mixture of a plurality of powders of individual materials and the use of a powder of materials that have already been combined together to form a complex compound.

In step 1, the powder may be uniformly laid down at a thickness of from 5 μm to 100 μm. In particular, the thickness may be from 20 μm to 30 μm. The core building powder may be a mixture of a plurality of powders with different average particle sizes, and there is no limitation as long as sufficient flowability is ensured. For example, sufficient flowability is ensured if the angle of repose is 45° or less. The powders of the major and minor components may have average particle sizes of from 5 μm to 100 μm. From the viewpoint of flowability, the major component may be closer in shape to spheres. The absorber that absorbs and converts infrared laser light into heat may have an average particle size of 10 μm or less. The average particle size is the median size D50.

The material for the substrate 19 placed on the stage 14 of the container 13 can be selected from materials such as ceramic, metal, and glass as appropriate by taking into account, for example, the use of the built object and the manufacturing conditions. The surface of the substrate 19 may have a flatness of 100 μm or less. The surface of the substrate 19 may have some irregularities as long as, after the core building powder uniformly laid down on the surface is solidified by irradiation with a laser beam, the solidified portion can be bonded to the substrate 19.

Step 2: Step of Solidifying Powder by Irradiation with Laser Beam

In step 2, the laser beam 18 emitted from the laser light source 16 is scanned across the powder 20 uniformly laid down on the substrate 19 at a predetermined thickness in step 1 by the scanner unit 17 based on three-dimensional data for the casting core to be manufactured to perform direct drawing.

When the powder 20 is irradiated with the laser beam 18, the energy of the laser beam 18 absorbed by the powder 20 is converted into heat to melt the powder 20. After completion of irradiation with the laser beam 18, the molten powder is cooled and solidified by the atmosphere and the surrounding region adjacent thereto to form a solidified portion corresponding to one cross-section of the casting core.

Laser beam irradiation during building may be performed by line scans, and each plane may be formed by a plurality of adjacent line scans. The thickness of a powder layer (the setting of the stage lowering width) may be from 5 μm to 100 μm. From the viewpoint of building accuracy, when a planar shape is built, the laser output power and the drawing speed may be adjusted so that the line width is about 50 μm to about 200 μm, and the average distance between adjacent lines is preferably from 20 μm to 400 μm, more preferably from 50 μm to 200 μm.

The ratio of the line-to-line distance (drawing pitch) in laser beam irradiation to the thickness of a powder layer (line-to-line distance/powder layer thickness) may be from 4 to 6. However, this does not apply when a non-planar shape such as a lattice structure or a porous portion is accomplished depending on the shape elements of the core.

Steps 1 and 2 above are alternately performed multiple times to manufacture a built object 21 as a casting core. When a powder uniformly laid down in step 1 on the solidified portion formed in step 2 is irradiated with a laser beam depending on three-dimensional data, the irradiated portion of the powder is sintered or melted and solidified, and the solidified portion is melted near the interface with the powder. During solidification, the solidified portion formed earlier and the solidified portion formed later are bonded together to form a one-piece built object.

Step 3: Baking Step

After completion of step 3, the built object 21 is separated from the substrate 19, and a support or other member added for building as necessary is removed from the built object 21. Thus, the shape of the casting core is finished.

The built object 21 in this state can be used in a casting step if the built object 21 satisfies the conditions required of casting cores; however, a baking step may be performed to increase structural stability.

The baking step is performed to repair vacancies and cracks formed in the casting core during manufacture or to eliminate an oxygen-deficient state due to laser irradiation. The casting core may also be impregnated with a material necessary for repairing cracks before baking.

If a casting core obtained from a powder composed of $Al_2O_3$, $Gd_2O_3$, and $Tb_4O_7$ is impregnated with a liquid (repair liquid) containing a material that can become zirconia before baking, a crack repair effect can be achieved. Impregnation and baking may be repeatedly performed multiple times as necessary because the crack repair effect can be enhanced by repeating impregnation and baking multiple times. The baking temperature may be from 1,662° C. to 1,710° C. Examples of liquids containing materials that can become zirconia include a liquid obtained by diluting a 85% by weight 1-butanol solution of zirconium butoxide 16-fold with 2-propanol and adding a stabilizer and a liquid obtained by adding a stabilizer to an aqueous zirconium acetate solution or a zirconia particle dispersion.

The casting core thus impregnated and baked after building can be composed of components such as $Al_2O_3$, (GdTb)$AlO_3$, (GdTb)$_4Al_2O_9$, and stabilized $ZrO_2$ component. Some residual powder or impregnation material may be present in the casting core.

For a casting core obtained from a powder composed of $SiO_2$, $Al_2O_3$, and SiO, a crack repair effect can be achieved simply by baking without impregnation with a repair liquid. To increase the strength of a region where a crack is formed, the casting core may be impregnated with a repair liquid similar to that mentioned above before baking. In this case, baking may be performed at a temperature matching the mixing ratio of $SiO_2$ to $Al_2O_3$, for example, from about 1,660° C. to about 1,950° C. The casting core thus impregnated with the repair liquid and baked after building can be composed of components such as $SiO_2$, $Al_2SiO_5$, $Al_6Si_2O_{13}$, $Al_2O_3$, and $ZrSiO_4$. Some residual powder or repair liquid may be present in the casting core.

Step 4: Machining Step

A machining step may be performed in order to improve the surface flatness of the casting core or so that the shape of the casting core falls within the designated tolerance.

If the resulting casting core exceeds the designated tolerance, the casting core may be machined by a process such as grinding or blasting so that the shape of the casting core falls within the designated tolerance. In addition to the process such as grinding or blasting, a coat layer may be provided on the surface to improve the surface smoothness. For example, the casting core may be coated by applying and baking a material like a graze or may be coated by thermal spraying. Because the surface of the casting core comes into contact with cast metal, the coat layer may be formed of a component similar to the casting core or a material that does not react with metals and that exhibits alkali solubility.

Process of Manufacturing Cast Part

Step 5: Casting Step

There is no difference between a casting step using the casting core according to the present disclosure and a step using a casting core in the related art. To fabricate a mold combined with a wax, the core is placed in a mold, and a wax is poured and solidified therein. After release from the mold, an outer shell made of an oxide is formed on the surface of the wax. The wax portion is then melted and removed by heating to form a region for metal injection. Thereafter, various types of casting can be performed by providing a filter for collecting dust from molten metal during injection or by providing a crystal grain selection region for controlling the metal structure after solidification. The casting core according to the present disclosure includes a surface layer and a core that have a dense structure and therefore has a higher strength than casting cores in the related art. Thus, the casting core can withstand a casting step that takes a long period of time and can therefore be used for casting of aircraft engine parts.

Step 6: Step of Dissolving Casting Core

After completion of casting, the outer shell is broken and removed, and the cast metal combined with the casting core is placed in a leaching apparatus and is immersed in an alkaline solution to perform a casting core dissolution step. In the dissolution step, pressurization and depressurization may be repeated, which allows the alkaline solution to enter the casting core through the exposed portion provided therein and thus allows the alkaline solution to reflux easily through the intermediate layer.

EXAMPLES

Figure 3:
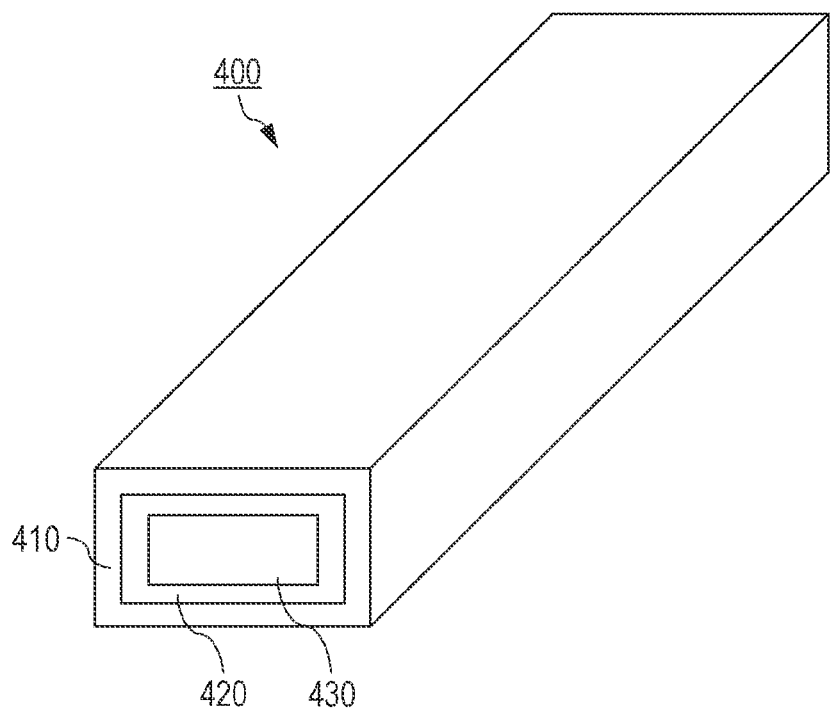
FIG. 3 illustrates a structure fabricated in the examples and the comparative examples.

The structure of the casting core according to the present disclosure was tested for flexural strength and was evaluated for solubility in alkaline solutions. As shown in FIG. 3, the evaluation was performed on seven types of pillar-shaped structures 400 with a width of 4 mm, a height of 3 mm, and a length of 38 mm, with three samples fabricated for each type. The seven types of structures 400 are identical in that they were designed such that a surface layer 410 had a wall thickness of 0.5 mm, an intermediate layer 420 had a wall thickness of 0.5 mm, and a core 430 had a size of 2 mm×1 mm×38 mm, but differ from each other in the combination of the structures of the surface layer 410, the intermediate layer 420, and the core 430.

Building Powders

Two types of building powders, namely, Material Systems A and B, were prepared.
Material System A
Material System A is a mixture of powders of $Al_2O_3$, $Gd_2O_3$, and $Tb_4O_7$ in the following ratio. $Al_2O_3$ is a major component, and $Gd_2O_3$ and $Tb_4O_7$ are minor components. $Tb_4O_7$ functions as an absorber.
Weight ratio: $Al_2O_3:Gd_2O_3:Tb_4O_7$=49.1:46.7:4.2
Molar ratio: $Al_2O_3:Gd_2O_3:Tb_4O_7$=78.2:20.9:0.9
As the raw materials for $Al_2O_3$, $Gd_2O_3$, and $Tb_4O_7$, the following powders were used:
Spherical $Al_2O_3$ powder (median size: about 20 μm)
Spherical $Gd_2O_3$ powder (median size: about 30 μm)
Pulverized $Tb_4O_7$ powder (median size: about 4 μm)
Material System B
Material System B is a mixture of powders of $SiO_2$, $Al_2O_3$, and SiO in the following ratio. $SiO_2$, $Al_2O_3$, and SiO can be major components, and SiO functions as an absorber.
Weight ratio: $SiO_2:Al_2O_3$:SiO=44.3:53.6:2.1
Molar ratio: $SiO_2:Al_2O_3$:SiO=56.3:40.1:3.6
As the raw materials for $SiO_2$, $Al_2O_3$, and SiO, the following powders were used:
Spherical $SiO_2$ powder (median size: about 38 μm)
Spherical $Al_2O_3$ powder (median size: about 20 μm)
Pulverized SiO powder (median size: about 5 μm)

Repair Liquid

As the liquid (repair liquid) used for impregnation with a zirconium component in the baking step, a liquid was prepared by diluting a 85% by weight 1-butanol solution of zirconium butoxide 16-fold with 2-propanol and adding a stabilizer such that the Zr concentration was 13 wt % and was used. After impregnation, the samples were all baked at 1,680° C., for 20 minutes.

Building Method

A ProX DMP 200 manufactured by 3D Systems, Inc. was used for building. An alumina plate with a size of 110 mm×120 mm×3 mm was used as a substrate. The layer thickness at which the raw material powder was uniformly laid down was 25 μm. Building was performed in a direction in which a surface with a size of 5 mm×38 mm was parallel to the substrate.

To fabricate the structure 400, a rectangular parallelepiped with a size of 5 mm×6 mm×38 mm was first built. During building, in an inner region with a size of 4 mm×3 mm×38 mm, a core was formed in a central region with a size of 2 mm×1 mm×38 mm, and an intermediate layer was formed in the region other than the core.

After the built object was separated from the substrate, the step of impregnation with the repair liquid and baking was repeatedly performed until it was confirmed that there were no cracks or other defects. The built object was then ground to a size of 4 mm×3 mm×38 mm so that a surface layer with a wall thickness of 0.5 mm remained uniformly on the outer periphery of the intermediate layer.

The conditions for building a dense portion using Material System A were as follows: an infrared fiber laser output power of 294 W, a laser scan speed of 1,500 mm/sec, and a scan pitch of 130 μm. Relatively dense porous bodies were built by changing the scan pitch to 180.

The conditions for building a dense portion using Material System B were as follows: an infrared fiber laser output power of 294 W, a laser scan speed of 1,000 mm/sec, and a scan pitch of 130 μm.

Evaluation of Structures

The seven types of structures thus fabricated were tested for three-point flexural strength at room temperature and 1,500° C. and were evaluated for solubility in alkaline solutions. The solubility evaluation was performed by immersing each sample in a 25 wt % aqueous sodium hydroxide solution at 160° C. for 48 hours while repeating a seven-minute cycle of pressurization to 0.5 MPa and depressurization back to normal pressure in order to promote permeation, diffusion, and reflux of the aqueous solution to details. The samples were visually inspected for a change in the original shape, such as a reduction in wall thickness or breakage, and were evaluated as good when their shapes were broken in 48 hours and as poor when their shapes were maintained after 48 hours.

Samples in which the surface layer 410 was a dense portion and the structures of the intermediate layer 420 and the core 430 were changed were fabricated using Material System A as a building powder and were evaluated.

Comparative Example 1

The portions corresponding to the surface layer 410, the intermediate layer 420, and the core 430 were all built under the conditions for building a dense portion. After the built object was separated from the substrate, the step of impregnation with the repair liquid and baking was repeatedly performed four times, and it was confirmed that there were no cracks or other defects. The built object was then ground to a size of 4 mm×3 mm×38 mm.

The structure of the present comparative example was a dense structure with no distinction between the surface layer, the intermediate layer, and the core. The relative density of the dense structure was calculated to be 99.1% based on a theoretical density of 5.72 $g/cm^3$.

Comparative Example 2

The intermediate layer 420 and the core 430 were built as a lattice structure, and the surface layer 410 was built as a dense portion. The lattice structure was built as a diamond structure with a relative density of 10.3%. Both were built under the conditions for forming a dense portion using Material System A.

After the built object was separated from the substrate, the step of impregnation with the repair liquid and baking was performed twice. After it was confirmed that there were no cracks or other defects, grinding was performed. The lattice structures of the intermediate layer 420 and the core 430 were exposed in a surface of the structure with a size of 4 mm×3 mm.

For the structure of the present comparative example, the surface layer 410 was a dense portion with a thickness of 0.5 mm, and the intermediate layer 420 and the core 430 had a uniform lattice structure with no distinction therebetween.

The average relative density of the entire structure was 59.5%. When it is assumed that the relative density of the dense portion is identical to that of Comparative Example 1, the relative density of the lattice region is 19.9%, which is higher than expected, i.e., 10.3%. This is probably because the beams of the resulting lattice were slightly thicker.

Example 1

The intermediate layer 420 was built as a lattice structure, and the surface layer 410 and the core 430 was built as a dense portion. All portions were fabricated under the conditions for building a dense portion. The lattice structure of the intermediate layer 420 was built as a diamond structure with a relative density of 10.3%. After the built object was separated from the substrate, the step of impregnation with the repair liquid and baking was repeatedly performed twice. After it was confirmed that there were no cracks or other defects, grinding was performed. The lattice structure of the intermediate layer 420 was exposed in a surface of the structure with a size of 4 mm×3 mm.

For the structure of the present example, the surface layer was a dense portion with a thickness of 0.5 mm, the intermediate layer had a lattice structure, and the core was a dense portion with a thickness of 1 mm. The average relative density of the entire structure was 73.7%. When it is assumed that the relative density of the dense portion is identical to that of Comparative Example 1, the relative density of the lattice region is 22.9%, which is higher than expected, i.e., 10.3%. This is probably because the beams of the resulting lattice were slightly thicker.

Example 2

Material System A was used as a building powder. The intermediate layer 420 was built as a porous portion with channels, and the surface layer 410 and the core 430 were built as a dense portion. The intermediate layer 420 was built under the conditions for building a relatively dense porous portion, and the other portions were built under the conditions for building a dense portion.

Six channels with a diameter of 0.4 mm were provided along the sides with a length of 38 mm at the four corners of the intermediate layer 420 and near the centers of the sides with a length of 2 mm of the core. The design relative density of the intermediate layer 420 of the present example can be calculated to be 66.5%, which falls within a preferred range of relative density of the intermediate layer, i.e., 67% or less.

After the built object was separated from the substrate, the step of impregnation with the repair liquid and baking was repeatedly performed twice. After it was confirmed that there were no cracks or other defects, grinding was performed. The porous structure and channels of the intermediate layer 420 were exposed in a surface of the structure with a size of 4 mm×3 mm.

For the structure of the present example, the surface layer 410 was a dense portion with a thickness of 0.5 mm, the intermediate layer 420 was a relatively dense porous structure with channels, and the core 430 was a dense portion with a thickness of 1 mm. The average relative density of the entire structure was 88.3%. When it is assumed that the relative density of the dense portion is identical to that of Comparative Example 1, the relative density of the porous region with channels is estimated to be 66.7%, which is similar to the calculated value.

The fabricated samples of Comparative Examples 1 and 2 and Examples 1 and 2 were tested for three-point flexural strength and were evaluated for solubility in alkaline solutions. The results are shown in Table 1. In the table, relative density is shown in parentheses.

TABLE 1

| | Material system of building powder | Structure (relative density [%]) | | | Three-point flexural strength [MPa] | | |
|---|---|---|---|---|---|---|---|
| | | Surface layer | Intermediate layer | Core | Room temperature | 1,500° C. | Solubility |
| Comparative Example 1 | A | Dense (99.1) | Dense (99.1) | | 171 | 54 | Poor |
| Comparative Example 2 | | | Lattice (11.9) | | 117 | 47 | Good |
| Example 1 | | | Lattice (22.9) | Dense (99.1) | 148 | 51 | Good |
| Example 2 | | | Porous + channels (66.5) | Dense (99.1) | 154 | 52 | Good |

It was found that Comparative Example 1, which was dense in its entirety, had poor solubility and was not soluble within a period of time acceptable for practical use. Comparative Example 2, in which the intermediate layer 420 and the core 430 had a lattice structure, had a lower flexural strength than Comparative Example 1, which was dense, although there was no problem with solubility.

Examples 1 and 2, in which the core 430 was dense, exhibited improvements in flexural strength of about 20% at room temperature and about 10% in the region near the casting temperature, i.e, 1,500° C., compared to Comparative Example 2, and the alkali solubility was similar to that of Comparative Example 2.

These results demonstrate that, if the surface layer 410 and the core 430 have a structure with a higher relative density than the intermediate layer 420, as in the present disclosure, it is possible to improve the flexural strength at room temperature and high temperature while maintaining the solubility in alkaline solutions, Next, samples in which the surface layer 410 was a relatively dense porous portion and the structures of the intermediate layer 420 and the core 430 were changed were fabricated using Material System A as a building powder and were evaluated.

Comparative Example 3

The surface layer 410, the intermediate layer 420, and the core 430 were all built as a relatively dense porous portion.

After the built object was separated from the substrate, the step of impregnation with the repair liquid and baking was repeatedly performed four times. After it was confirmed that there were no cracks or other defects, grinding was performed.

The structure of the present comparative example was formed of a relatively dense porous material with no distinction between the surface layer, the intermediate layer, and the core. The relative density was calculated to be 82.4% based on a theoretical density of 5.72 g/cm$^3$.

Comparative Example 4

The intermediate layer 420 was built as a lattice structure, and the surface layer 410 and the core 430 were built as a relatively dense porous portion. The lattice structure of the intermediate layer 420 was built as a diamond structure with a relative density of 10.3%.

Both were built under the conditions for forming a dense portion using Material System A.

After the built object was separated from the substrate, the step of impregnation with the repair liquid and baking was repeatedly performed twice. After it was confirmed that there were no cracks or other defects, grinding was performed. The lattice structure of the intermediate layer 420 was exposed in a surface of the structure with a size of 4 mm×3 mm.

For the structure of the present comparative example, the surface layer 410 was a dense portion with a thickness of 0.5 mm, and the intermediate layer 420 and the core 430 had a uniform lattice structure with no distinction therebetween. The relative density of the entire built object was calculated to be 48.5%. When it is assumed that the relative density of the relatively dense porous portion is identical to that of Comparative Example 3, the relative density of the lattice region is 14.5%, which is higher than expected, i.e., 10.3%. This is probably because the beams of the resulting lattice were slightly thicker.

Example 3

The intermediate layer 420 was built as a lattice structure, and the other portions were built as a relatively dense porous portion.

The lattice structure was built as a diamond structure with a relative density of 10.3%, as in Example 1. After the built object was separated from the substrate, the step of impregnation with the repair liquid and baking was repeatedly performed twice. After it was confirmed that there were no cracks or other defects, grinding was performed. The lattice structure of the intermediate layer 420 was exposed in a surface of the structure with a size of 4 mm×3 mm.

For the structure fabricated in the present example, the surface layer 410 was a relatively dense porous portion with a thickness of 0.5 mm, the intermediate layer 420 had a lattice structure, and the core 430 was formed of a relatively dense porous portion with a thickness of 1 mm. The average relative density of the entire structure was 61.4%. When it is assumed that the relative density of the relatively dense porous portion is identical to that of Comparative Example 1, the relative density of the intermediate layer 420 is 19.3%, which is higher than expected, i.e., 10.3%. This is probably because the beams of the resulting lattice were slightly thicker.

The fabricated samples of Comparative Examples 3 and 4 and Example 3 were tested for three-point flexural strength and were evaluated for solubility in alkaline solutions. The results are shown in Table 2. In the table, relative density is shown in parentheses.

TABLE 2

| | Material system of building powder | Structure (relative density [%]) | | | Three-point flexural strength [MPa] | | |
|---|---|---|---|---|---|---|---|
| | | Surface layer | Intermediate layer | Core | Room temperature | 1,500° C. | Solubility |
| Comparative Example 3 | A | Porous (82.4) | Porous (82.4) | | 74 | 32 | Poor |
| Comparative Example 4 | | | Lattice (14.5) | | 42 | 28 | Good |
| Example 3 | | | Lattice (19.3) | Porous (82.4) | 59 | 30 | Good |

Comparative Example 3, which was formed of a relatively dense porous material, had a slightly higher solubility than Comparative Example 1. However, the shape was not broken within the time, indicating that Comparative Example 3 was not soluble within an acceptable period of time, as in Comparative Example 1. In addition, Comparative Example 3 had a lower flexural strength than Comparative Example 1, which was dense in its entirety.

Comparative Example 4 and Example 3, in which the intermediate layer 420 had a lattice structure, both had good solubility in alkaline solutions. Although Example 3, which had a structure according to the present disclosure, had a lower flexural strength than Comparative Example 1, which was dense in its entirety, Example 3 exhibited improvements in flexural strength of about 20% at room temperature and about 10% in the region near the casting temperature, i.e., 1,500° C., compared to Comparative Example 4.

These results demonstrate that, if the surface layer 410 and the core 430 have a structure with a higher relative density than the intermediate layer 420, as in the present disclosure, it is possible to improve the flexural strength at room temperature and high temperature while maintaining the solubility in alkaline solutions, Samples in which the surface layer 410 was a dense portion and the structures of the intermediate layer 420 and the core 430 were changed were fabricated using Material System B as a building powder and were evaluated.

Comparative Example 5

The surface layer 410, the intermediate layer 420, and the core 430 were all built as a dense portion.

After the built object was separated from the substrate, the step of impregnation with the repair liquid and baking was performed once. After it was confirmed that there were no cracks or other defects, grinding was performed.

The structure of the present comparative example was a pillar-shaped dense structure with a size of 4 mm×3 mm×38 mm and no distinction between the surface layer, the intermediate layer, and the core. The relative density of the dense structure was 92.7%.

After the built object was separated from the substrate, the step of impregnation with the repair liquid and baking was performed once. After it was confirmed that there were no cracks or other defects, grinding was performed. The lattice structure of the intermediate layer 420 was exposed in a surface of the structure with a size of 4 mm×3 mm.

For the structure of the present example, the surface layer was a dense portion with a thickness of 0.5 mm, the intermediate layer had a lattice structure, and the core was a dense portion with a thickness of 1 mm. The average relative density of the entire structure was 83.9%. When it is assumed that the relative density of the dense portion is identical to that of Comparative Example 1, the relative density of the lattice region is 66.3%, as expected.

The fabricated samples of Comparative Examples 5 and 6 and Example 4 were tested for three-point flexural strength and were evaluated for solubility in alkaline solutions. The results are shown in Table 3. In the table, relative density is shown in parentheses.

TABLE 3

| | Material system of building powder | Structure | | | Three-point flexural strength [MPa] | | |
|---|---|---|---|---|---|---|---|
| | | Surface layer | Intermediate layer | Core | Room temperature | 1,500° C. | Solubility |
| Comparative Example 5 | B | Dense (92.7) | Dense (92.7) | | 102 | 107 | Poor |
| Comparative Example 6 | | | Lattice (63.7) | | 54 | 68 | Good |
| Example 4 | | | Lattice (66.3) | Dense (92.7) | 64 | 75 | Good |

Comparative Example 6

The intermediate layer 420 and the core 430 were built as a lattice structure, and the surface layer 410 was built as a dense portion. The lattice structure was built as a gyroid structure with a relative density of 66.3%.

After the built object was separated from the substrate, the step of impregnation with the repair liquid and baking was performed once. After it was confirmed that there were no cracks or other defects, grinding was performed. The lattice structures of the intermediate layer 420 and the core 430 were exposed in a surface of the structure with a size of 4 mm×3 mm.

For the structure of the present comparative example, the surface layer 410 was a dense portion with a thickness of 0.5 mm, and the intermediate layer 420 and the core 430 had a uniform lattice structure with no distinction therebetween. The average relative density of the entire structure was 78.2%.

When it is assumed that the relative density of the dense portion is identical to that of Comparative Example 1, the relative density of the lattice region is 63.7%, which is lower than expected, i.e., 66.3%. This is probably because the beams of the resulting lattice were slightly thinner.

Example 4

Material System B was used as a building powder. The intermediate layer 420 was built as a lattice structure, and the other portions were built as a dense portion. The lattice structure was built as a gyroid structure with a relative density of 66.3%.

It was found that Comparative Example 5, which was dense in its entirety, had poor solubility and was not soluble within a period of time acceptable for practical use. Comparative Example 6, in which the intermediate layer 420 and the core 430 had a lattice structure, had a lower flexural strength than Comparative Example 5, which was dense, although there was no problem with solubility.

Example 4, in which the core 430 was dense, exhibited improvements in flexural strength of about 20% at room temperature and about 10% in the region near the casting temperature, i.e., 1,500° C., compared to Comparative Example 6, and the alkali solubility was similar to that of Comparative Example 6.

These results demonstrate that, if the surface layer 410 and the core 430 have a structure with a higher relative density than the intermediate layer 420, as in the present disclosure, it is possible to improve the flexural strength at room temperature and high temperature while maintaining the solubility in alkaline solutions, Next, it was confirmed that the configuration of the present disclosure is also applicable to casting core shapes.

Comparative Example 7

A built object having the shape shown in FIG. 1A was built in a direction in which the exposed portion 107 was in contact with the substrate under the same conditions as in Comparative Example 2. Specifically, for the structure of Comparative Example 7, the surface layer 101 was formed of a dense portion with a thickness of 0.5 mm, and the intermediate layer 102 and the core 103 were formed of a lattice structure with no distinction therebetween, The size of the structure in FIG. 1A is roughly 30 mm×8 mm×60 mm.

First, in the separation step before baking, some of the beams forming the lattice were broken due to their fragility in terms of strength and their thinness at the surface of the lattice structure having a diamond structure in contact with the substrate. After the built object was separated from the substrate, the step of impregnation with the repair liquid and baking was repeatedly performed twice, and it was confirmed that there were no cracks or other defects.

After completion of the baking step, the structure of the built object was observed. In the wide portions (about 7 mm) of the lattice structure, there were regions where the beams of the lattice were slightly broken due to the effect of the slight pressure applied when the powder was uniformly laid down during building. It was found that a built object which has the originally intended shape, that is, a casting core shape, and in which both the intermediate layer 102 and the core 103 have a lattice structure is fragile and difficult to handle before baking, which was not clear for the built object fabricated in Comparative Example 2 since the width of the building surface of the lattice portion was narrow.

Example 5

A structure having the shape shown in FIG. 1A was fabricated in a direction in which the exposed portion 107 was in contact with the substrate under the same conditions as in Example 1. The surface layer 101 was formed of a dense portion with a thickness of 0.5 mm. The intermediate layer 102 was built as a lattice structure with a thickness of 2 mm from the inner surface of the surface layer 101, and in the portion having a thickness of more than 2.5 mm in its entirety, the core 103 was built as a dense portion.

In the step of separation from the substrate, the lattice portion was not broken and had sufficient strength as a structure. After separation, the step of impregnation with the zirconium component and baking was repeatedly performed three times, and it was confirmed that there were no cracks or other defects.

When the structure of the built object was observed after completion of baking, no structural defects were found.

Example 6

A built object having the same shape as in Example 5 was fabricated except that the surface layer 101 had a thickness of 0.4 mm. The surface of the built object was then coated with aluminum oxide by plasma spraying to form a coat layer with a thickness of 0.1 mm.

When the surface was observed, no noticeable cracks were found. The built object was cut, and the cross-sectional structure of the surface layer 101 was observed. It was found that a sprayed layer of aluminum oxide was deposited as a coat layer on the surface of the surface layer 101.

These results demonstrate that, if a casting core includes three portions, namely, a core, an intermediate layer, and a surface layer, and the intermediate layer has a structure with a lower relative density than the surface layer and the core, the casting core has high mechanical strength and good solubility and is superior to casting cores in the related art.

According to the present disclosure, a three-layer structure including a dense surface layer, a dense core, and an intermediate layer having a lattice structure can improve the mechanical strength of a metal casting core formed of a ceramic while maintaining its alkali solubility and thus allows for high manufacturing yield even if the casting time is long.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-067068, filed Apr. 12, 2021, which is hereby incorporated by reference herein in its entirety.

What is claimed is:

1. A casting core containing a ceramic, the casting core comprising:
   a core;
   a surface layer; and
   an intermediate layer between the core and the surface layer,
   wherein a relative density of the intermediate layer is lower than a relative density of the surface layer, and the relative density of the intermediate layer is lower than a relative density of the core, and
   wherein the relative density of the core is 82% or more, the relative density of the surface layer is 82% or more, and the relative density of the intermediate layer is 67% or less.

2. The casting core according to claim 1, wherein the surface layer has a thickness of 0.2 mm or more.

3. The casting core according to claim 1, wherein the relative density of the intermediate layer is from 20% to 67%.

4. The casting core according to claim 1, wherein the surface layer has a thickness of from 0.3 mm to 3 mm.

5. The casting core according to claim 1, wherein the intermediate layer has a thickness of 0.2 mm or more.

6. The casting core according to claim 1, wherein the intermediate layer has a thickness of from 0.5 mm to 5 mm.

7. The casting core according to claim 1, including a portion in which the core and the intermediate layer are exposed in a surface thereof.

8. The casting core according to claim 1, wherein the intermediate layer has a structure with a void of which size is 0.2 mm or more.

9. The casting core according to claim 1, wherein the intermediate layer has a structure with a void of which size is 0.2 mm or less.

10. The casting core according to claim 9, wherein the intermediate layer includes a channel.

11. The casting core according to claim 1, wherein the ceramic is an oxide containing at least one element selected from the group consisting of silicon, aluminum, and zirconium.

12. The casting core according to claim 1, wherein a total content of alkali and alkaline earth metals is 0.1% by weight or less.

13. The casting core according to claim 1, further comprising a coat layer on at least a portion of a surface of the surface layer.

* * * * *